US012784749B2

(12) United States Patent
Lv

(10) Patent No.: US 12,784,749 B2
(45) Date of Patent: Nov. 3, 2026

(54) METHOD AND SYSTEM OF CONTROLLING IN-VEHICLE INFORMATION SYSTEM

(71) Applicant: ShangHai Qwik Smart Technology Co.,Ltd., Shanghai (CN)

(72) Inventor: Dawei Lv, Shanghai (CN)

(73) Assignee: ShangHai Qwik Smart Technology Co., Ltd., Shanghai (CN)

( * ) Notice: Subject to any disclaimer, the term of this patent is extended or adjusted under 35 U.S.C. 154(b) by 296 days.

(21) Appl. No.: 18/564,583

(22) PCT Filed: Jul. 13, 2021

(86) PCT No.: PCT/CN2021/106071

§ 371 (c)(1),
(2) Date: Nov. 27, 2023

(87) PCT Pub. No.: WO2022/252351

PCT Pub. Date: Dec. 8, 2022

(65) Prior Publication Data

US 2024/0379103 A1 Nov. 14, 2024

(30) Foreign Application Priority Data

Jun. 2, 2021 (CN) ........................ 202110613144.4

(51) Int. Cl.
*G10L 15/04* (2013.01)
*B60K 35/10* (2024.01)
(Continued)

(52) U.S. Cl.
CPC .............. *G10L 15/22* (2013.01); *B60K 35/10* (2024.01); *B60W 50/08* (2013.01); *G10L 15/04* (2013.01);
(Continued)

(58) Field of Classification Search
CPC ..... G10L 15/22; G10L 15/04; G10L 15/1822; G10L 2015/088; G10L 2015/223; B60K 35/10; B60W 50/08
See application file for complete search history.

(56) References Cited

U.S. PATENT DOCUMENTS 8,311,995 B1 * 11/2012 Maraschi-Schouschtari ............... H04L 67/51 707/694
8,380,572 B2 * 2/2013 Mehta .................... G06Q 30/02 705/14.49
(Continued)

FOREIGN PATENT DOCUMENTS

CN 112298080 A 5/2014
CN 108563790 A 9/2018
(Continued)

OTHER PUBLICATIONS

The World Intellectual Property Organization (WIPO) International Search Report for PCT/CN2021/106071 Mar. 8, 2022 7 Pages (including translation).

*Primary Examiner* — Paras D Shah
*Assistant Examiner* — Oluwadamilola M Ogunbiyi
(74) *Attorney, Agent, or Firm* — ANOVA LAW GROUP, PLLC

(57) ABSTRACT

A method of controlling the in-vehicle information system includes: collecting voice data of a user; performing voice recognition on the collected voice data to obtain corresponding speech information; performing semantic analysis to obtain multiple pieces of slot information; segmenting and combining the multiple pieces of slot information into multiple control instructions based on preset combination configuration information; and sequentially executing the multiple control instructions.

16 Claims, 2 Drawing Sheets

(51) Int. Cl.
*B60W 50/08* (2020.01)
*G10L 15/08* (2006.01)
*G10L 15/18* (2013.01)
*G10L 15/22* (2006.01)

(52) U.S. Cl.
CPC .... *G10L 15/1822* (2013.01); *G10L 2015/088* (2013.01); *G10L 2015/223* (2013.01)

(56) References Cited

U.S. PATENT DOCUMENTS

| | | | | |
|---|---|---|---|---|
| 10,298,247 | B1 * | 5/2019 | Frew | H03M 1/0624 |
| 10,303,492 | B1 * | 5/2019 | Wagner | G06F 9/547 |
| 10,909,019 | B2 * | 2/2021 | Pandey | G06F 11/0784 |
| 2010/0250874 | A1 * | 9/2010 | Farrell | G11C 7/22<br>711/155 |
| 2011/0093467 | A1 * | 4/2011 | Sharp | G06F 16/2228<br>707/E17.069 |
| 2014/0040722 | A1 * | 2/2014 | Reich | G10L 15/22<br>715/234 |
| 2014/0214425 | A1 * | 7/2014 | Bak | G10L 15/08<br>704/249 |
| 2014/0337024 | A1 * | 11/2014 | Zuo | G10L 15/1822<br>704/239 |
| 2015/0348551 | A1 * | 12/2015 | Gruber | G10L 15/1822<br>704/235 |
| 2017/0069321 | A1 * | 3/2017 | Toiyama | G10L 17/02 |
| 2018/0182380 | A1 | 6/2018 | Fritz et al. | |
| 2018/0275155 | A1 * | 9/2018 | Matsuoka | G01N 35/026 |
| 2018/0337817 | A1 * | 11/2018 | Cirne | G06F 11/3409 |
| 2019/0081902 | A1 * | 3/2019 | Cartwright | H04L 1/0042 |
| 2019/0130306 | A1 * | 5/2019 | Singh | G06N 20/00 |
| 2020/0216086 | A1 * | 7/2020 | Lenke | B60W 50/08 |
| 2020/0357393 | A1 * | 11/2020 | Wu | B60K 35/10 |
| 2021/0110716 | A1 * | 4/2021 | Becker | B60W 30/085 |
| 2021/0120335 | A1 * | 4/2021 | Veselinovic | H04R 1/406 |
| 2021/0174797 | A1 * | 6/2021 | Choi | G06F 3/167 |
| 2021/0268393 | A1 * | 9/2021 | Smith | A63G 31/00 |
| 2021/0318984 | A1 * | 10/2021 | Park | G06F 15/7807 |
| 2022/0013128 | A1 * | 1/2022 | Saito | G06F 3/017 |
| 2022/0358943 | A1 * | 11/2022 | So | H04W 24/08 |

FOREIGN PATENT DOCUMENTS

| | | | |
|---|---|---|---|
| CN | 109086282 | A | 12/2018 |
| CN | 109101545 | A | 12/2018 |
| CN | 109241524 | A | 1/2019 |
| CN | 109739965 | A | 5/2019 |
| CN | 109754793 | A | 5/2019 |
| CN | 109841212 | A | 6/2019 |
| CN | 110019687 | A | 7/2019 |
| CN | 110413250 | A | 11/2019 |
| CN | 110704641 | A | 1/2020 |
| CN | 110853645 | A | 2/2020 |
| CN | 111368538 | A | 7/2020 |
| CN | 111538817 | A | 8/2020 |
| CN | 111722825 | A | 9/2020 |
| CN | 111738016 | A | 10/2020 |
| CN | 114186563 | A | 3/2022 |
| JP | 2020144375 | A | 9/2020 |

* cited by examiner

METHOD AND SYSTEM OF CONTROLLING IN-VEHICLE INFORMATION SYSTEM

CROSS-REFERENCE TO RELATED APPLICATION

This application is a national stage application of International Application No. PCT/CN2021/106071, filed on Jul. 13, 2021, which claims priority to Chinese Patent Application No. 202110613144.4, filed with the China National Intellectual Property Administration (CNIPA) on Jun. 2, 2021, the entire contents of all of which are incorporated herein by reference.

TECHNICAL FIELD

The present disclosure relates to the technical field of in-vehicle information system control technologies and, more particularly, to a method and a system of controlling an in-vehicle information system.

BACKGROUND

It is well known that when people are visually occupied, people are more suitable for auditorily receiving urgent and important notifications. Especially when people are driving, they need to hold a steering wheel with both hands, and their eyes need to look at the road ahead at all times, to maintain a high degree of concentration to ensure driving safety. However, sometimes when people encounter emergency situations while driving, or suddenly want to adjust certain configurations in their car, because their visual channel is occupied at this time, it is hard to do other things. In such scenarios, voice interactions can be introduced into cars.

SUMMARY

One aspect of the present disclosure provides a method of controlling an in-vehicle information system. The method includes: collecting voice data of a user; performing voice recognition on the collected voice data to obtain corresponding speech information; performing semantic analysis to obtain multiple pieces of slot information; segmenting and combining the multiple pieces of slot information into multiple control instructions based on preset combination configuration information; and sequentially executing the multiple control instructions.

Another aspect of the present disclosure provides a system of controlling an in-vehicle information system. The system includes: an in-vehicle information terminal configured to collect voice data of a user and sequentially execute multiple control instruction obtained by parsing the voice data; and a data processing terminal configured to perform voice recognition on the collected voice data to obtain corresponding speech information, perform semantic analysis on the speech information to obtain multiple pieces of slot information, and segment and combine the multiple pieces of slot information into multiple control instructions according to preset combination configuration information.

Another aspect of the present disclosure provides a computer-readable storage medium storing computer instructions. When being executed by a processor, the computer instructions cause the processor to perform: collecting voice data of a user; performing voice recognition on the collected voice data to obtain corresponding speech information; performing semantic analysis to obtain multiple pieces of slot information; segmenting and combining the multiple pieces of slot information into multiple control instructions based on preset combination configuration information; and sequentially executing the multiple control instructions.

BRIEF DESCRIPTION OF THE DRAWINGS

The above-described features and advantages of the present disclosure can be better understood through the detailed description of the embodiments of the present disclosure in conjunction with the accompanying drawings. In the drawings, components are not necessarily drawn to scale, and components with similar related properties or characteristics may have the same or similar reference numerals.

DETAILED DESCRIPTION OF THE EMBODIMENTS

Figure 1:
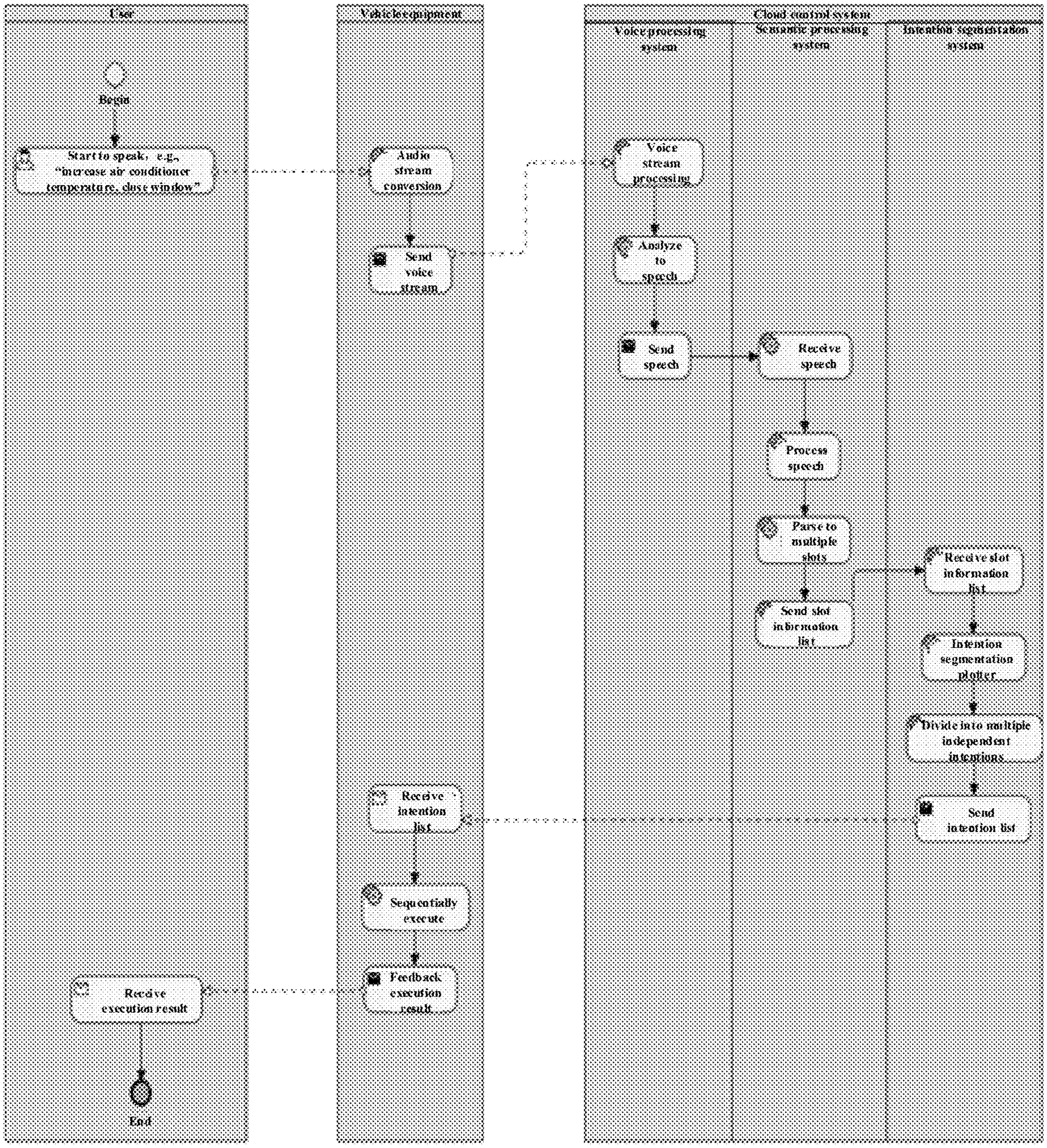
FIG. 1 is an overall architectural diagram of an exemplary method of controlling an in-vehicle information system according to some embodiments of the present disclosure.

The embodiments of the present disclosure will be illustrated by various examples below, and those skilled in the art can easily understand other advantages and effects of the present disclosure from the description disclosed in the specification. Although the description of the disclosure will be presented in conjunction with preferred embodiments, it is not intended that the features of the disclosure be limited to these embodiments only. On the contrary, the objective of describing the disclosure in conjunction with the various embodiments is to cover other options or modifications that may be extended based on the claims of the present disclosure. The following description contains numerous details to provide a thorough understanding of the present disclosure. The disclosure may also be practiced without certain details. In addition, certain details may be omitted from the description to focus on key aspects of the present disclosure.

In the description of the present disclosure, it should be noted that unless otherwise specified and limited, the terms "installation", "connection" and "connection" should be understood in a broad sense. For example, it may be a fixed connection, a detachable connection, or an integral connection. It may be a mechanical connection or an electrical connection. It may be a direct connection or an indirect connection through an intermediary, and it may be an internal connection between two components. Those of ordinary skill in the art can understand specific meanings of the above terms in the present disclosure in specific situations.

Under certain circumstances, the term "voice recognition" denotes identification of who is doing the speaking, and the term "speech recognition" denotes identification of what is being said. However, in this specification, both "voice recognition" and "speech recognition" are used interchangeably to denote identification of what is being said.

In addition, the terms "up", "down", "left", "right", "top", "bottom", "horizontal", and "vertical" used in the following description should be understood as orientation shown in the accompanying drawings. The relative terms are used for convenience of description only, and do not imply that a device described therein must be manufactured or operated in a specific orientation, and thus should not be construed as limiting the present disclosure.

It should be understood that although the terms "first", "second", "third", etc. may be used herein to describe various components, regions, layers and/or sections, these components, regions, layers and/or sections should not be limited by these terms, and these terms are merely used to distinguish different components, regions, layers and/or sections. Thus, a first component, region, layer and/or section discussed below could also be described as a second component, region, layer and/or section without departing from the scope of the embodiments of the present disclosure.

One aspect of evaluating an artificial intelligence voice interaction function (or module) of an in-vehicle information system is an intention comprehension module. That is, whether it can understand or recognize an intention expressed by a user is the core aspect to measure effectiveness of artificial intelligence. The in-vehicle information system may also be referred to as an in-vehicle entertainment system, an in-vehicle infotainment system, or an in-vehicle equipment system.

In the existing technology, the artificial intelligence voice interaction module in the vehicle-equipment system may only recognize a single intention contained in one sentence, and generate a control instruction according to the single intention to control the operation of the in-vehicle information system. However, in the actual application of the voice interaction module, the user often puts forward a series of multiple operation instructions in the same voice data at the same time, which needs to be executed by the in-vehicle information system. At this time, a method and a system of a single intention artificial intelligence voice interaction are often unable to comprehensively and accurately determine the user's real intention based on multiple operation instructions and multiple operation objects in the same voice data, such that it is common to miss some operation instructions, or even execute incorrect operation instructions.

In order to overcome the above-described problems in the existing technology, there is an urgent need in this field for a voice interaction technology that can comprehensively and accurately determine the user's true intention according to the multiple operation instructions and multiple operation objects in the same voice data. Thus, intelligent interaction between the in-vehicle information system and the user may be achieved, efficiency of the voice interaction may be increased, and the user experience may be improved.

One aspect of the present disclosure provides a method of controlling an in-vehicle information system.

FIG. 1 is an overall architectural diagram of an exemplary method of controlling an in-vehicle information system order according to some embodiments of the present disclosure.

As shown in FIG. 1, a system of controlling the in-vehicle information system includes an in-vehicle information terminal and a data processing terminal. The in-vehicle information terminal is configured to collect user's voice data and send the user's voice data to the data processing terminal for analysis, and then obtains multiple single-intention control instructions from the data processing terminal for execution one by one. The data processing terminal may be configured in a cloud control system, and may be used for semantic analysis and intention combination of the voice data sent by the in-vehicle information terminal, to generate multiple single-intention control instructions that can be correctly recognized and executed by the in-vehicle information terminal.

The method of controlling the in-vehicle information system includes the following processes. First, the in-vehicle information terminal may use a microphone module of a vehicle to collect the user's voice data, and may send the user's voice data to the data processing terminal in the cloud for the semantic analysis and intention combination. Then, the data processing terminal may perform speech recognition on the received voice data to obtain corresponding speech information, and then perform the semantic analysis on the obtained speech information to obtain multiple slot information. Then, the data processing terminal may combine the obtained multiple slot information into multiple single-intention control instructions according to preset combination configuration information, and send the multiple single-intention control instructions to the in-vehicle information terminal for execution one by one.

In some embodiments, collecting the user's voice data at the in-vehicle information terminal includes: using a microphone module to collect multiple analog recording signals of the user; converting the collected multiple analog recording signals into corresponding digital voice signals; and synthesizing the converted digital voice signals into voice stream data in a time sequence.

Digital signals are formed on the basis of analog signals through sampling, quantization, and encoding. For example, sampling is to obtain sample values at each moment of the input analog signal at an appropriate time interval, quantization is to express the values at each moment measured by sampling in binary code, and encoding is to arrange the binary numbers generated by quantization together to form a pulse sequence. Analog signals are generally quantized into digital signals by means of pulse code modulation (PCM), that is, different amplitudes of the analog signal correspond to different binary values.

After an analog recording signal is converted into a digital voice signal, confidentiality of communication is enhanced. After a voice signal is converted by an analog/digital (A/D) converter, it may be encrypted first prior to being sent, and after being decrypted at a receiving end, it may be restored to an analog signal by a digital/analog (D/A) converter. Moreover, after the analog recording signal is converted into the digital voice signal, the digital voice signal not only improves resistance against interference, especially in the relay, but also eliminates accumulation of noise during regeneration of the digital voice signal. Transmission errors during analog-to-digital conversion can be controlled, thereby improving transmission quality. Moreover, the analog-to-digital conversion facilitates the use of modern digital signal processing technology to process digital information, builds an integrated digital communication network, comprehensively transmits various messages, and enhances the function of the communication system.

In some embodiments, as shown in FIG. 1, the in-vehicle information terminal may be configured with a human-computer interaction interface such as a voice collection button. The user may click the voice collection button to start the microphone module of the vehicle to collect the user's voice, for example, "turn on the air conditioner", "close the sunroof". An audio stream will be sent by the microphone module to the processor at the in-vehicle information terminal, and the audio stream will be converted to a voice stream by the processor at the in-vehicle information terminal.

The audio stream refers to a practice of delivering real-time audio over a network connection. This type of data transfer (or data flow) requires a certain protocol to handle a time sequence of data packets or other transfer types to provide on-demand contents to end users. The audio stream utilizes a buffering system and a secure streaming platform to allow the end users to listen to full audio files without interruption. This type of data flow requires a large bandwidth.

In some embodiments, the audio stream of "turn on the air conditioner and close the sunroof" includes eight analog recording signals, that is, "turn", "on", "air", "conditioner", "and", "close", "sun", and "roof". The microphone module at the in-vehicle information terminal collects the eight analog recording signals, and the processor at the in-vehicle information terminal converts the collected analog recording signals into corresponding digital voice signals. The digital voice signals are then synthesized into the voice stream data in a chronological order, and the obtained voice stream data is sent to the data processing terminal by the in-vehicle information terminal of the in-vehicle information system.

The voice stream data is arranged and synthesized according to the time sequence of multiple digital voice signals received. For example, after the analog-to-digital conversion, the processor sequentially obtains eight digital voice signals, that is, "turn", on, "air", "conditioner", "and", "close", "sun", and "roof". According to an order in which the eight digital voice signals are obtained, the voice stream data of "turn on the air conditioner and close the sunroof" is synthesized.

The in-vehicle information terminal sends the obtained voice stream data to the data processing terminal. In some embodiments, the data processing terminal is configured in the cloud control system, including a voice processing system, a semantic processing system, and an intention segmentation system.

The voice processing system performs voice recognition to parse the received voice stream data into corresponding speech information.

The speech information refers to text information that is extracted by the voice processing system (e.g., speech recognition system), conforms to a specific structure and contains key information. Generally, the text information often refers to colloquial information text spoken by the user, such as "Please turn on the air conditioner for me and close the sunroof by the way". The speech information corresponding to this example may be "turn on the air conditioner and close the sunroof". Compared with the colloquial information text, the speech information is more conducive to the semantic analysis in the subsequent semantic processing system, such that the control instructions contained in the voice stream data can more quickly and accurately analyzed.

After the voice processing system parses the voice stream data into the speech information, the voice processing system sends the obtained speech information to the semantic processing system that is also configured at the data processing terminal for further semantic analysis of speech text.

The semantic analysis of the speech information includes: extracting keywords from the received speech information by the semantic processing system. For example, four keywords can be extracted from "turn on the air conditioner, close the sunroof", which are "turn on", ""air conditioner", "close", "sunroof". The obtained multiple keywords may be classified according to preset slot attributes to obtain corresponding slot attributes through mapping each keyword to slot information of the corresponding slot attributes.

A slot refers to an identifier of the key information used to accurately express an intention in a sentence in which the user expresses the intention. The intention may have one or more slots, depending on how many pieces of the key information the intention requires. For example, in the intention of "query the weather", we know that the weather in different places on different days is different. Usually, when people ask about the weather, they need to provide the weather on which day and place to check. Then, "inquiry date" and "inquiry city" are taken as two pieces of the key information of the weather intention, and these two pieces of the key information are created as slots.

In some embodiments, the slot attributes include verb attributes and noun attributes. The verb attributes further include category attributes of various actions such as opening, closing, raising, lowering, increasing, decreasing, connecting, disconnecting, and rotating. The noun attributes further include category attributes of various objects such as air conditioner, audio equipment, video equipment, and communication equipment. The slot attributes of each noun type can only be combined with the slot attributes of some action types.

In the above example, the keywords in "turn on the air conditioner, close the sunroof" are "turn on", "air conditioner", "close", and "sunroof" where "turn on" and "close" are the slot information of the verb attributes. "Air conditioner" and "sunroof" are the slot information of the noun attributes.

In some embodiments, each piece of the slot information is arranged according to a first order in which the keywords are extracted from the speech information, to form a slot information list. The first order refers to a sequence of the keywords extracted from the speech text. For example, in the phrase "turn on the air conditioner, close the sunroof", the first order in which the keywords are extracted is "turn on", "air conditioner", "close", and "sunroof". The slot information list refers to a list of all pieces of the slot information contained in the speech text. For example, the contents in the slot information list in the above example are "turn on", "air conditioner", "close", and "sunroof".

The semantic processing system sends the slot information list including multiple pieces of the slot information to the intention segmentation system configured at the data processing terminal.

Referring back to FIG. 1, the data processing terminal also includes the intention segmentation system. The intention segmentation system is configured to combine the obtained multiple pieces of the slot information into multiple control instructions according to the preset combination configuration information. After the intention segmentation system receives the slot information list sent from the semantic processing system, the intention segmentation system divides the pieces of the slot information in the slot information list into multiple independent intentions through an intention segmentation policer, and the multiple independent intentions may form one or more intention lists. The intention segmentation system sends the one or more intention lists to the in-vehicle information terminal.

Figure 2:
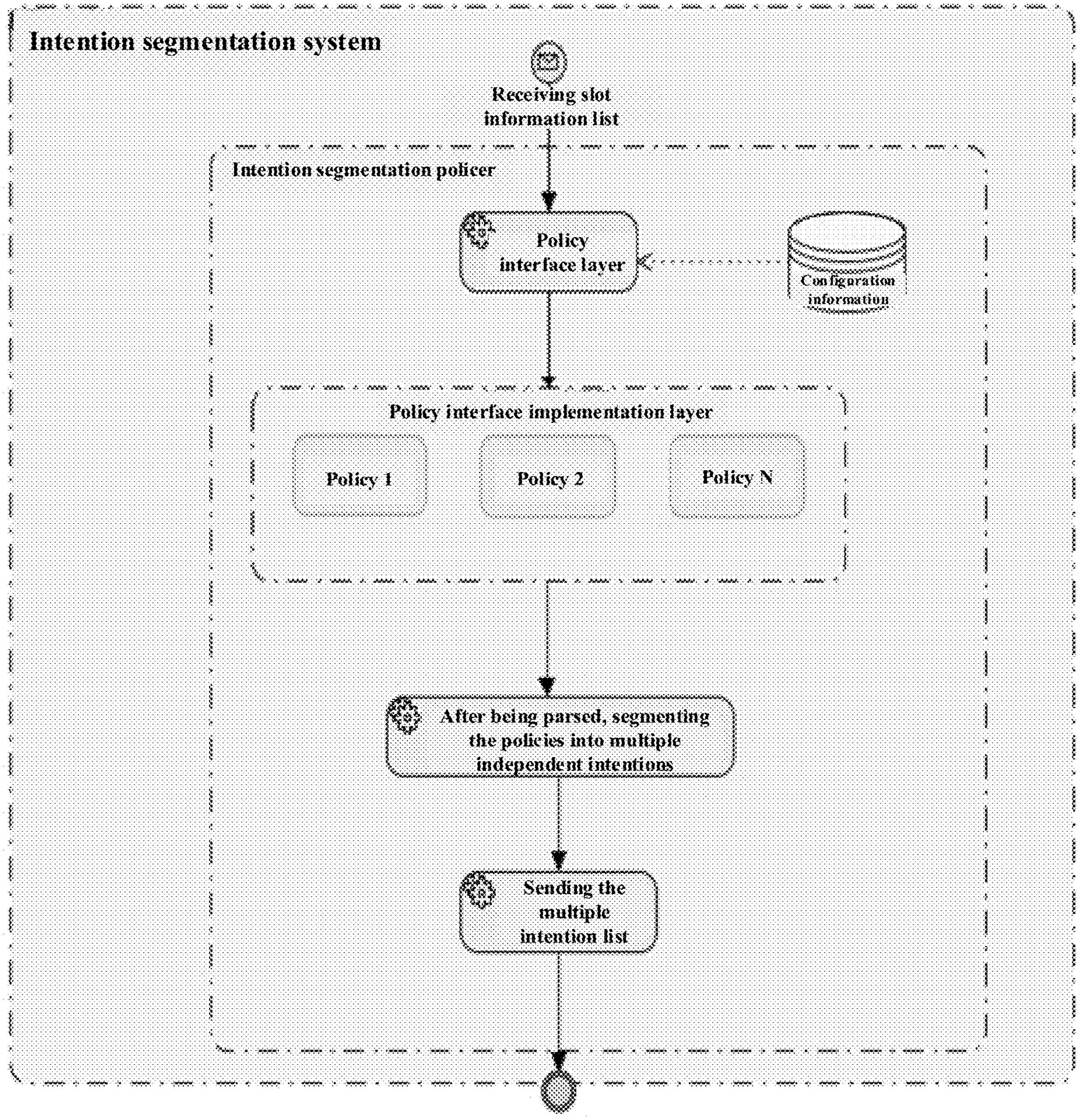
FIG. 2 is a schematic diagram of intention segmentation in the method of controlling the in-vehicle information system according to some embodiments of the present disclosure.

FIG. 2 is a schematic diagram of intention segmentation in the method of controlling the in-vehicle information system according to some embodiments of the present disclosure.

In some embodiments, as shown in FIG. 2, after the intention segmentation system receives the slot information list, the intention segmentation system sends the slot information list to the intention segmentation policer. The intention segmentation policer divides and combines the slot information in the slot information list according to a configuration information list configured at a policy interface layer to form the multiple independent intentions.

For example, the configuration information list includes multiple types of combination policies, and each set of the combination policies exists in a form of (first slot attribute, combination direction, second slot attribute). Each combination policy in the configuration information list is arranged in a preset second order. The second order is a policy arrangement order defined by a designer, and is configured to indicate an order in which a policy interface implementation layer selects the combination policies to try.

When performing intention segmentation, the intention segmentation system determines a first piece of slot information in the slot information list according to the first order, that is, the piece of slot information represented by a first keyword extracted from the speech information. For example, in the speech information of "increase the temperature of the air conditioner and close the windows", the first piece of slot information is "increase". Then, the intention segmentation system may determine a first combination policy whose first slot attribute is "improved" according to the second order.

In the above example, for the speech information of "increase the temperature of the air conditioner and close the window", assuming that the first policy in the configuration information list is (turn on or off, backward, air conditioner), its first slot attribute indicates an opening operation or a closing operation, which does not match the first piece of slot information "increase" in the speech information. As such, the intention segmentation system then determines whether the first slot attribute of the next combination policy matches the piece of slot information "increase". Assuming that the second policy in the configuration information list is (raise or lower, backward, air conditioner), its first slot attribute indicates a raising operation or a lowering operation. The first slot attribute of the second policy matches the first piece of slot information "improvement" in the speech information. As such, the intention segmentation system determines the second policy to be the first combination policy in which the first slot attribute matches the slot attribute of the first piece of slot information.

Then, the intention segmentation system determines one by one whether the slot attributes of the remaining pieces of slot information in the slot information list match the second slot attribute according to the combination direction indicated by the second policy (e.g., backward). It should be understood that the backward here refers to a backward direction in the first order, that is, a backward direction sequentially from the first piece of slot information, the second piece of slot information, to the third piece of slot information in the slot information list. This combination direction is generally more in line with the user's habit of speaking in the order of verbs first and then nouns, such as "turn on the sound", "turn down the volume" and so on. Thus, the preferred combination sequence in the present disclosure is backward combination, and the first slot attribute in the combination policy is preferably the verb slot attribute.

In some embodiments, each combination policy may also involve a forward combination direction that reverses the first order to conform to a habit of certain users in the speaking order of verbs before nouns, such as "turn on the sound", "turn down the volume", etc. Correspondingly, the first slot attribute in each combination policy provided by the embodiments of the present disclosure is preferably the verb slot attribute (e.g., turn up or turn down, forward, sound equipment).

In the example of "increase the temperature of the air conditioner and close the windows", the first piece of slot information is "increase", and the second policy is the first combination policy. The combination direction indicated by the first combination policy is backward combination. At this time, the remaining pieces of slot information in the slot information list is "the temperature of the air conditioner", "close", and "windows". The intention segmentation policer sequentially determines a matching degree between the slot attributes of the remaining pieces of slot information in the slot information list and the second slot attribute of the second policy at the policy interface implementation layer. If the second slot attribute of the second policy is "air conditioner", which properly matches the slot attribute of "air conditioner temperature" in the remaining pieces of slot information in the slot information list, then the intention segmentation system sets "the temperature of the air conditioner" as the first remaining piece of slot information matching the second slot attribute of the second policy, and combines "the temperature of the air conditioner" and "increase" into a single-intention control instruction, namely "increase the temperature of the air conditioner".

Conversely, in the example of "increase the audio volume and close the window", the remaining pieces of slot information in the slot information list include "audio volume", "close", "windows", which do not match with the second slot attribute of the second policy (air-conditioning equipment), then the intention segmentation system further determines the next combination policy in which the first slot attribute matches the slot attribute of the first piece of slot information (i.e., "increase") according to the second order. Assuming that a third policy in the configuration information list is (raise or lower, backward, audio equipment), its first slot attribute indicates the raising operation or the lowering operation. The first slot attribute of the third policy matches the first piece of slot information "increase" in the speech information. As such, the intention segmentation system determines the third policy to be the next combination policy in which the first slot attribute matches the slot attribute "increase", and determines one by one backward whether the slot attributes of the remaining pieces of slot information in the slot information list match the second slot attribute of the third policy "sound equipment" along the combination direction indicated by the third policy. At this time, the slot attribute of "audio volume" in the remaining pieces of slot information in the slot information list properly matches the second slot attribute "audio equipment" of the third policy. Then, the intention segmentation system sets "audio volume" as the first remaining piece of slot information matching the second slot attribute of the third policy, and "audio volume" and "increase" are combined into a single-intention control instruction, namely "increase audio volume".

In the process of dividing the slot information list into multiple independent intentions and combining them into multiple control instructions in the intention segmentation policer, in response to the combination obtaining a control instruction, the intention segmentation system deletes multiple pieces of slot information involved in the control instruction from the original slot information list, and determines another first piece of slot information in the slot information list according to the first order.

Referring to the example of "increase the temperature of the air conditioner and close the windows", after the first control instruction "increase the temperature of the air conditioner" is obtained, the intention segmentation system deletes the two pieces of slot information "increase" and "the temperature of the air conditioner" involved in the first control instruction from the original slot information list. At this time, the remaining pieces of slot information in the new slot information list include "close" and "windows". The intention segmentation policy then determines "close" to be the first piece of slot information in the new slot information list according to the order in which the keywords are extracted from the speech text, and combines/forms a new control instruction according to various combination policies in the configuration information list. The process of combining the new control instruction is the same as described in the previous embodiments, and will not be repeated herein.

Referring back to FIG. 1, the data processing terminal is further configured to arrange the multiple control instructions according to a combination sequence to construct an intention list, and to send the constructed intention list to the in-vehicle information terminal.

In some embodiments, as shown in FIG. 1, the in-vehicle information terminal receives the intention list sent from the data processing terminal, and executes the multiple control instructions in the intention list sequentially and in batches. For example, the in-vehicle information terminal may execute the first control instruction in the received intention list first, and count a time length for executing the first control instruction. In response to the execution time of the first control instruction reaching a preset time threshold (e.g., 3-5 seconds), the in-vehicle information terminal determines that the first control instruction has been executed, and thus execute the next control instruction in the intention list. Afterwards, the in-vehicle information terminal feeds back results of the in-vehicle information terminal executed control instructions to the user through a human-computer interaction interface such as vehicle's central control display and text-to-speech (TTS) module, to complete the entire control process of voice interaction of the in-vehicle information system.

Those skilled in the art understand that the above-described solution of configuring the data processing terminal in the cloud control system is only a non-limiting implementation provided by the present disclosure, which aims to transfer the processes of semantic analysis and intention segmentation to the cloud for implementation to reduce data processing load on the in-vehicle information side, and to enable more in-vehicle information systems with less powerful data processing capabilities to realize the function of multiple intention segmentation, thereby further promoting the technology provided by the present disclosure. However, it should be noted that the above-described embodiments do not limit the protection scope of the present disclosure. In some other embodiments, those skilled in the art can also configure the data processing terminal of the control system in the in-vehicle information system based on the above-described embodiments of the present disclosure, such that an individual equipment in the in-vehicle information system can realize the same effect of intention segmentation.

Although the methods described above are illustrated and described as a series of actions for simplicity of explanation, it should be appreciated that these methods are not limited by the order of the actions, as some actions may occur in a different order according to one or more embodiments and/or concurrently with other actions from those illustrated and described herein or not illustrated and described herein but can be understood by those skilled in the art.

Another aspect of the present disclosure also provides a system of controlling an in-vehicle information system. The system of controlling the in-vehicle information system realizes artificial intelligence voice interactive control in the in-vehicle information system by using the above-described method of controlling the in-vehicle information system. Operations of the in-vehicle information system are described in detail above, and will not be repeated herein. By implementing the above-described method, the system can comprehensively and accurately determine real intention of the user according to the multiple operation instructions and multiple operation objects in the same voice data, thereby further realizing the intelligent interaction between the in-vehicle information system and the user, increasing the efficiency of voice interaction, and improving the user experience.

Another aspect of the present disclosure provides a computer-readable storage medium on which computer instructions are stored. When the computer instructions are executed by a processor, the computer instructions cause the processor to perform the above-described methods for the user terminal and the data processing terminal to control the in-vehicle information system. By performing the methods provided by the present disclosure, the computer-readable storage medium comprehensively and accurately determines the real intention of the user according to the multiple operation instructions and multiple operation objects in the same voice data, thereby further realizing the intelligent interaction between the in-vehicle information system and the user, increasing the efficiency of voice interaction, and improving the user experience.

Although the in-vehicle information terminal and the data processing terminal described in the embodiments of the present disclosure may be realized by a combination of software and hardware. it should be understood that the in-vehicle information terminal and the data processing terminal may also be implemented in software or hardware. For hardware implementation, the in-vehicle information terminal and the data processing terminal may be implemented in one or more application-specific integrated circuits (ASICs), digital signal processors (DSPs), programmable logic devices (PLDs), field programmable gate arrays (FPGA), processors, controllers, microcontrollers, microprocessors, other electronic devices for performing the functions described above, or a combination thereof. For software implementation, the in-vehicle information terminal and the data processing terminal may be implemented by independent software modules such as procedures and functions running on a general-purpose chip, each of which executes one or more functions and operations described herein.

Those of skill in the art should understand that information, signals and data may be represented using any of a variety of different technologies and techniques. For example, data, instructions, commands, information, signals, bits, symbols, and chips referenced throughout the above description may be composed of voltages, currents, electromagnetic waves, magnetic fields or particles, optical fields or particles, or any combination thereof.

Those of skill in the art should further appreciate that various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon a particular application and design constraints imposed on the overall system. Those skilled in the art may implement the described functionality in various ways for each particular application, but such implementation decisions should not be interpreted as causing a departure from the scope of the present disclosure.

The various illustrative logic modules, and circuits described in connection with the embodiments disclosed herein may be implemented using a general-purpose processor, a digital signal processor (DSP), an application-specific integrated circuit (ASIC), a field-programmable gate array (FPGA), or other programmable logic devices, discrete gates or transistor logics, discrete hardware components, or any combination thereof designed to perform the functions described herein. The general-purpose processor may be a microprocessor, but alternatively, the processor may be any conventional processor, controller, microcontroller, or state machine. The processor may also be implemented as a combination of computing devices, e.g., a combination of a DSP and a microprocessor, multiple microprocessors, one or more microprocessors in cooperation with a DSP core, or any other such configurations.

The above description of the present disclosure is provided to enable any person skilled in the art to make or use the present disclosure. Various modifications to the present disclosure will be readily apparent to those skilled in the art, and the generic principles defined herein may be applied to other variations without departing from the spirit or scope of the present disclosure. Thus, the disclosure is not intended to be limited to the examples and designs described herein but is to be accorded the widest scope consistent with the principles and novel features disclosed herein.

What is claimed is:

1. A method of controlling an in-vehicle information system, comprising:
- collecting voice data of a user using a microphone module of a vehicle;
- performing speech recognition on the collected voice data to obtain corresponding speech information;
- performing semantic analysis on the speech information to obtain a slot information list including multiple pieces of slot information based on preset slot attributes;
- segmenting and combining the slot information list into multiple control instructions based on preset combination configuration information including multiple combination policies arranged in a first order, each combination policy including a first slot attribute, a combination direction, and a second slot attribute, by:
  - determining a first piece of slot information in the slot information list, and determining a first combination policy in which the first slot attribute matches the slot attribute of the first piece of the slot information;
  - along the combination direction indicated by the first combination policy, sequentially determining whether the slot attributes of the remaining pieces of slot information in the slot information list match the second slot attribute of the first combination policy, and combining a first remaining piece of slot information in which the slot attribute matches the second slot attribute of the first combination policy and the first piece of slot information into a first control instruction;
  - in response to none of the slot attributes of the remaining pieces of slot information in the slot information list matching the second slot attribute of the first combination policy, according to the first order, determining a next combination policy in which the first slot attribute matches the slot attribute of the first piece of slot information; and
  - along the combination direction indicated by the next combination policy, sequentially determining whether the slot attributes of the remaining pieces of slot information in the slot information list match the second slot attribute of the next combination policy, and combining the first remaining piece of slot information in which the slot attribute matches the second slot attribute of the next combination policy and the first piece of slot information into a next control instruction; and
- sequentially executing, by the in-vehicle information system, the multiple control instructions.

2. The method according to claim 1, wherein collecting the voice data of the user comprises:
- using the microphone module to collect multiple analog recording signals of the user;
- converting the multiple analog recording signals into corresponding digital voice signals respectively; and
- arranging the digital voice signals to form voice stream data according to a time sequence thereof.

3. The method according to claim 2, wherein performing the speech recognition on the collected voice data comprises:
- performing a speech recognition process on the collected voice data and parsing into the corresponding speech information.

4. The method according to claim 1, wherein performing the semantic analysis to obtain the slot information list based on the preset slot attributes comprises:
- extracting one or more keywords from the speech information;
- according to the preset slot attributes, classifying the one or more keywords into pieces of slot information corresponding to the preset slot attributes; and
- according to a second order of the one or more keywords extracted from the speech information, arranging the pieces of slot information to construct the slot information list.

5. The method according to claim 1 further comprising:
- in response to combining to obtain one control instruction, deleting multiple pieces of slot information involved in the one control instruction from the slot information list, and returning to determine the first piece of slot information in the slot information list according to the second order.

6. The method according to claim 1 further comprising:
- in response to combining to obtain each control instruction, counting a time length in which the in-vehicle information system executes a preceding control instruction; and
- in response to the in-vehicle information system executing the preceding control instruction for the time length reaching a preset time threshold, controlling the in-vehicle information system to execute a next control instruction.

7. A system of controlling a vehicle equipment system, comprising:
- a vehicle equipment terminal configured to collect voice data of a user using a microphone module of a vehicle and sequentially execute, by the in-vehicle information system, multiple control instructions obtained by parsing the voice data; and
- a data processing terminal configured to perform speech recognition on the collected voice data to obtain corresponding speech information, perform semantic analysis on the speech information to obtain a slot information list including multiple pieces of slot information based on preset slot attributes, and segment and combine the slot information list into multiple control instructions based on preset combination configuration information including multiple combination policies arranged in a first order, each combination policy including a first slot attribute, a combination direction, and a second slot attribute;

wherein the data processing terminal further includes an intention segmentation system configured to:

determine a first piece of slot information in the slot information list, and determine a first combination policy in which the first slot attribute matches the slot attribute of the first piece of the slot information;

along the combination direction indicated by the first combination policy, sequentially determine whether the slot attributes of the remaining pieces of slot information in the slot information list match the second slot attribute of the first combination policy, and combine a first remaining piece of slot information in which the slot attribute matches the second slot attribute of the first combination policy and the first piece of slot information into a first control instruction;

in response to none of the slot attributes of the remaining pieces of slot information in the slot information list matching the second slot attribute of the first combination policy, according to the first order, determine a next combination policy in which the first slot attribute matches the slot attribute of the first piece of slot information; and along the combination direction indicated by the next combination policy, sequentially determine whether the slot attributes of the remaining pieces of slot information in the slot information list match the second slot attribute of the next combination policy, and combine the first remaining piece of slot information in which the slot attribute matches the second slot attribute of the next combination policy and the first piece of slot information into a next control instruction.

8. The system according to claim 7, wherein the vehicle equipment terminal is further configured to:

use the microphone module to collect multiple analog recording signals of the user;

convert the multiple analog recording signals into digital voice signals respectively;

arrange the digital voice signals to form voice stream data according to a time sequence thereof; and send the voice stream data to the data processing terminal.

9. The system according to claim 8, wherein:

the data processing terminal includes a voice processing system; and the voice processing system is configured to perform a speech recognition process on the voice stream data to parse the voice stream data into the corresponding speech information.

10. The system according to claim 7, wherein:

the data processing terminal includes a semantic analysis system; and the semantic analysis system is configured to:

extract one or more keywords from the speech information;

according to the preset slot attributes, classify the one or more keywords into pieces of slot information corresponding to the preset slot attributes; and according to a second order of the one or more keywords extracted from the speech information, arrange the pieces of slot information to construct the slot information list.

11. The system according to claim 7, wherein intention segmentation system is further configured to:

in response to combining to obtain one control instruction, delete multiple pieces of slot information involved in the one control instruction from the slot information list, and return to determine the first piece of slot information in the slot information list according to the second order.

12. The system according to claim 7, wherein:

the data processing terminal is further configured to:

arrange the multiple control instructions according to a combination sequence to construct an intention list; and send the intention list to the vehicle equipment terminal; and the vehicle equipment terminal is further configured to:

execute a first control instruction in the intention list;

count a time length of executing the first control instruction; and in response to the time length of executing the first control instruction reaching a preset time threshold, execute a next control instruction in the intention list.

13. A non-transitory computer-readable storage medium storing computer instructions, wherein when being executed by a processor, the computer instructions cause the processor to perform:

collecting voice data of a user using a microphone module of a vehicle;

performing speech recognition on the collected voice data to obtain corresponding speech information;

performing semantic analysis on the speech information to obtain a slot information list including multiple pieces of slot information based on preset slot attributes;

segmenting and combining the slot information list into multiple control instructions based on preset combination configuration information including multiple combination policies arranged in a first order, each combination policy including a first slot attribute, a combination direction, and a second slot attribute, by:

determining a first piece of slot information in the slot information list, and determining a first combination policy in which the first slot attribute matches the slot attribute of the first piece of the slot information;

along the combination direction indicated by the first combination policy, sequentially determining whether the slot attributes of the remaining pieces of slot information in the slot information list match the second slot attribute of the first combination policy, and combining a first remaining piece of slot information in which the slot attribute matches the second slot attribute of the first combination policy and the first piece of slot information into a first control instruction;

in response to none of the slot attributes of the remaining pieces of slot information in the slot information list matching the second slot attribute of the first combination policy, according to the first order, determining a next combination policy in which the first slot attribute matches the slot attribute of the first piece of slot information; and along the combination direction indicated by the next combination policy, sequentially determining whether the slot attributes of the remaining pieces of slot information in the slot information list match the second slot attribute of the next combination policy, and combining the first remaining piece of slot information in which the slot attribute matches the second slot attribute of the next combination policy and the first piece of slot information into a next control instruction; and sequentially executing, by the in-vehicle information system, the multiple control instructions.

14. The computer-readable storage medium according to claim 13, wherein when collecting the voice data of the user, the processor is further configured to:

use the microphone module to collect multiple analog recording signals of the user;

convert the multiple analog recording signals into corresponding digital voice signals respectively; and arrange the digital voice signals to form voice stream data according to a time sequence thereof.

15. The computer-readable storage medium according to claim 14, wherein when performing the speech recognition on the collected voice data, the processor is further configured to:

perform a speech recognition process on the collected voice data and parse into the corresponding speech information.

16. The computer-readable storage medium according to claim 13, wherein when performing the semantic analysis to obtain the slot information list based on the preset slot attributes, the processor is further configured to:

extract one or more keywords from the speech information;

according to the preset slot attributes, classify the one or more keywords into pieces of slot information corresponding to the preset slot attributes; and according to a second order of the one or more keywords extracted from the speech information, arrange the pieces of slot information to construct the slot information list.

* * * * *